R. F. C. SCHULTZ.
LOCKING BLOCK FOR BRAKE HANGERS.
APPLICATION FILED SEPT. 11, 1916.

1,220,367.

Patented Mar. 27, 1917.
2 SHEETS—SHEET 1.

Witness
George C. Schultz

Inventor
Richard F. C. Schultz
By
Rummler & Rummler
Attys

R. F. C. SCHULTZ.
LOCKING BLOCK FOR BRAKE HANGERS.
APPLICATION FILED SEPT. 11, 1916.
1,220,367.
Patented Mar. 27, 1917.
2 SHEETS—SHEET 2.
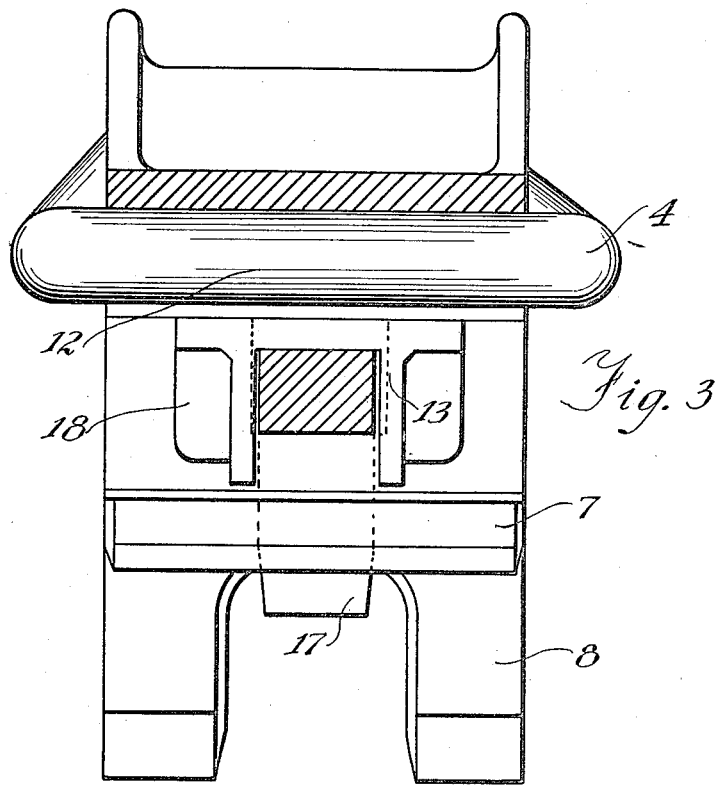
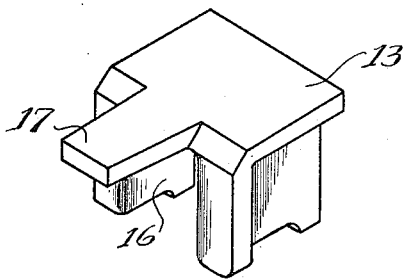
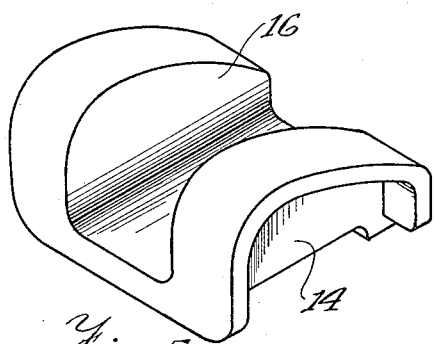
Witness
George C Schultz
Inventor
Richard F. C. Schultz
By Rummler & Rummler
Attys

UNITED STATES PATENT OFFICE.

RICHARD F. C. SCHULTZ, OF CHICAGO, ILLINOIS, ASSIGNOR TO JOLIET RAILWAY SUPPLY COMPANY, OF CHICAGO, ILLINOIS, A CORPORATION OF ILLINOIS.

LOCKING-BLOCK FOR BRAKE-HANGERS.

1,220,367.  Specification of Letters Patent.  Patented Mar. 27, 1917.

Application filed September 11, 1916. Serial No. 119,459.

*To all whom it may concern:*

Be it known that I, RICHARD F. C. SCHULTZ, a citizen of the United States of America, and a resident of Chicago, county of Cook, and State of Illinois, have invented certain new and useful Improvements in Locking-Blocks for Brake-Hangers, of which the following is a specification.

This invention relates to brake hangers for railway cars and more particularly to a construction of locking block designed for standard forms of brake heads and for the purpose of preventing displacement of the brake hanger with respect to the head.

The customary and well known arrangement of brake heads with respect to the car wheels with which they coöperate is to mount the brake heads below the pivotal centers of the wheels. Thus, when the brake heads are drawn horizontally into engagement with the wheels, the resulting thrust may increase or decrease the pressure of the brakes, depending upon the direction of rotation of the wheels. In the standard design of brake head now quite generally in use upon freight cars, the upward thrust in particular has a tendency to displace the brake hanger with respect to the heads. The hanger bears against the lower part of the recess in the brake head which receives the brake hanger, and since there is no projection extending above the flat surface of the bottom of the recess, the hanger slips forward against the brake shoe key, bending the key and permitting the brake head and shoe to rise still higher on the wheels. This results in the shoes and wheels jamming against each other, causing the latter to skid even though the brakes are otherwise properly adjusted.

The purpose of the present invention is to provide means whereby this fault of the foregoing type of brake head may be corrected without requiring that the same be replaced with a different design of brake head.

The main objects of the invention are to provide a locking block suitable for assembly with brake heads and brake shoes of a certain standard type and which cannot be removed except upon first removing the brake shoe key; to provide a locking block which prevents displacement of the brake hanger in relation to the brake head and also protects the brake shoe key against injury; and to provide means for retaining the locking block in proper position in the brake head after the brake shoe key and shoe are removed.

An illustrative embodiment of this invention is shown in the accompanying drawings, in which—

Fig. 3 is a sectional view taken on the line A—A of Fig. 1.

Fig. 4 is a perspective view of the locking block.

Fig. 5 shows in perspective a modified form of locking block.

Figure 1:
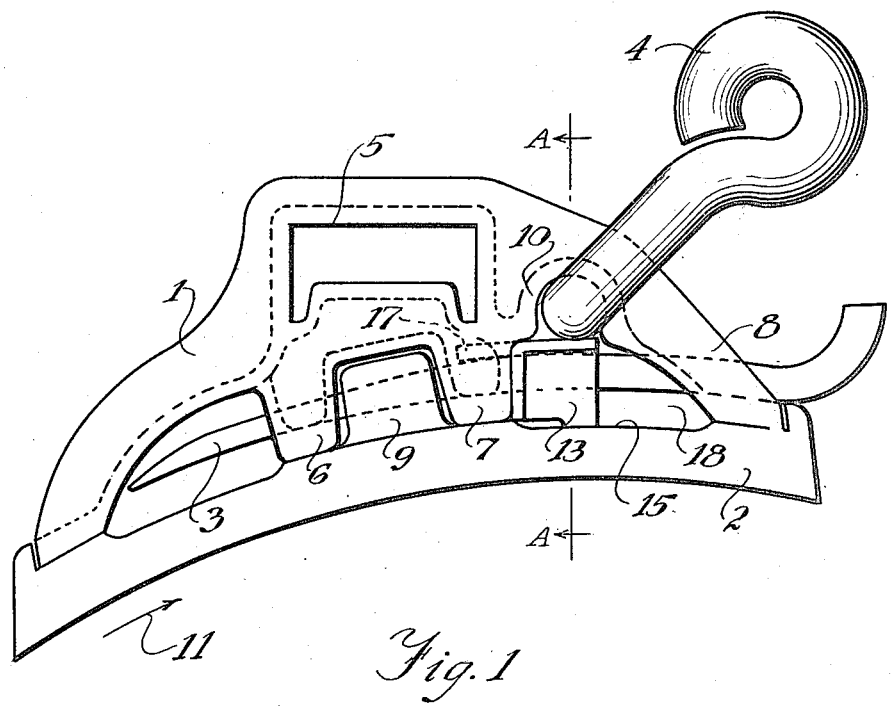
Figure 1 is a side view of a brake head, shoe and hanger, provided with the present improvement.
Figure 2:
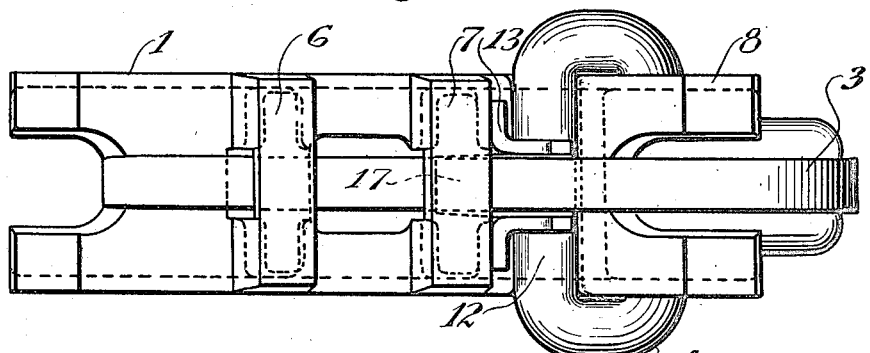
Fig. 2 is a front view of the brake head.

The brake head 1, shoe 2, key 3 and hanger 4 as shown in the drawings correspond to certain well known designs of these parts of a brake. The brake head 1 has the usual transverse opening 5 for receiving the end of a brake beam to which the brake head is rigidly secured. The brake head 1 also has the usual apertured center lugs 6 and 7 and the forked upper end 8, all of which are shaped to provide a key way for key 3. The key also passes through the center lug 9 of the brake shoe 2, thereby locking the shoe to the brake head. The recess 10 in the brake head for receiving hanger 4 is of the usual form for this type of brake head.

The construction above described is frequently employed in freight cars and is efficient in operation, except that at times when the brakes are applied and the wheel with which it coöperates is rotating in the direction indicated by the arrow 11, the thrust developed on the brake shoe causes the brake head to bear upwardly against the part 12 of the hanger. The part 12 then bears against the key 3, sometimes with sufficient pressure to bend the key and thereby permit the brake head to shift upwardly with respect to the hanger, causing the brake shoe to jam against the car wheel since the pivotal center of the wheel is above the center of the break head. The pressure developed between the brake shoe and the car wheel is thus greater than is intended and sometimes causes the wheel to skid and be worn at the point of contact with the rails.

To overcome this faulty operation, either one of the members shown in Figs. 4 and 5 may be assembled between lug 7 and the part 8 of the brake head, prior to securing the shoe 2 thereon. These locking blocks 13 and 14 are suitably formed to bear between the part 12 of the hanger and the surface 15 of the brake shoe, thus serving to transmit any thrust between the brake shoe and hanger and preventing displacement of the hanger with respect to the brake head and brake shoe. Each of the locking blocks has a longitudinal recess 16 through which the key 3 passes. The block 13 is also provided with a projection 17 for entering the key way in lug 7, and serving to retain the block in place even when the shoe 2 and key are removed. The locking block 14 as shown in the drawing is shaped to conform to the outline of the large opening 18 in the brake head.

It will be apparent that in the operation of the device, the thrust of the car wheel in either direction of rotation on the shoe 2 will be transmitted to the brake hanger through the block 13, thus preventing the hanger from becoming displaced and bearing inwardly against the key 3 and bending the key.

Although but one specific embodiment of this invention has been herein shown and described, it will be understood that numerous details of the construction shown may be altered or omitted without departing from the spirit of this invention as defined by the following claims.

I claim:

1. In a railway brake, the combination of a hanger, a brake head having a recess through which said hanger passes, a brake shoe, a key securing together the brake head and brake shoe and extending past said recess, and a locking block located between and bearing against said hanger and brake shoe for the purpose of preventing the hanger from being displaced in relation to the head or bearing against the key.

2. In a railway brake, the combination of a hanger, a brake head having a recess through which said hanger passes, a brake shoe, a key securing together the brake head and brake shoe and extending past said recess, and a locking block straddling said key located between said hanger and brake shoe for the purpose of preventing the hanger from being displaced in relation to the head or bearing against the key.

3. In a railway brake, the combination of a hanger, a brake head having a recess through which said hanger passes, a key way in said brake head, a brake shoe, a key securing the brake shoe and brake head together, and a locking block mounted in said brake head and bearing against said hanger to prevent displacement thereof, said locking block being provided with a lug extending into the key way in said brake head.

Signed at Chicago this 8th day of Sept., 1916.

RICHARD F. C. SCHULTZ.

Copies of this patent may be obtained for five cents each, by addressing the "Commissioner of Patents, Washington, D. C."